C. H. LAUTH.
ELECTRIC COOKING OR HEATING VESSEL AND APPARATUS.
APPLICATION FILED DEC. 16, 1919.
1,398,867.
Patented Nov. 29, 1921.
3 SHEETS—SHEET 1.
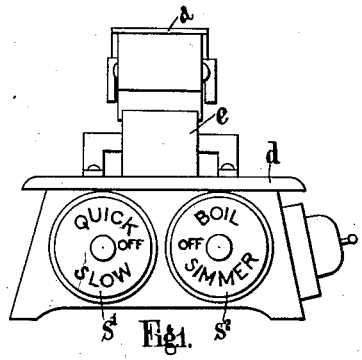
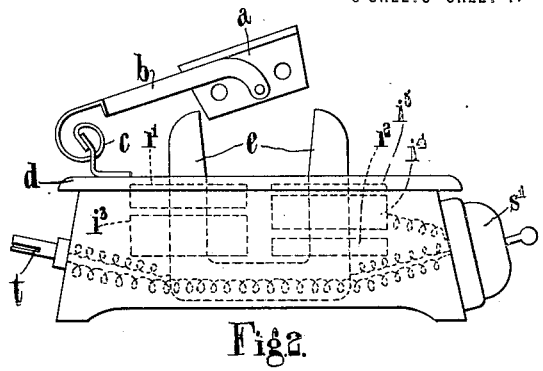
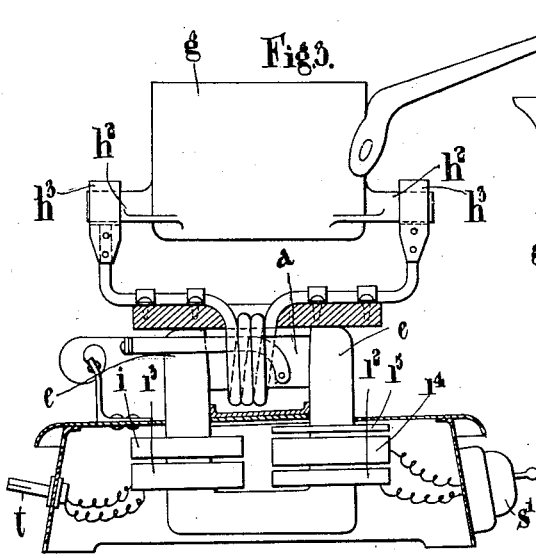
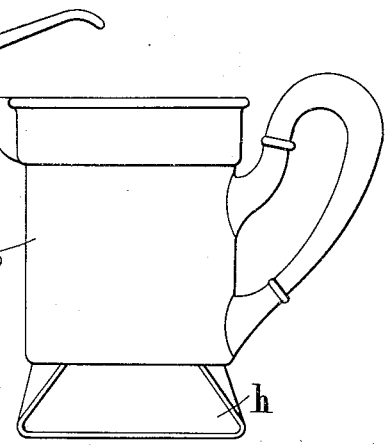
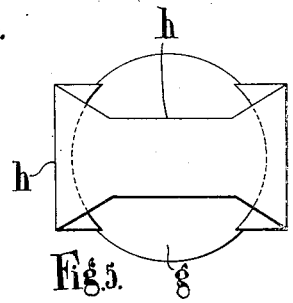
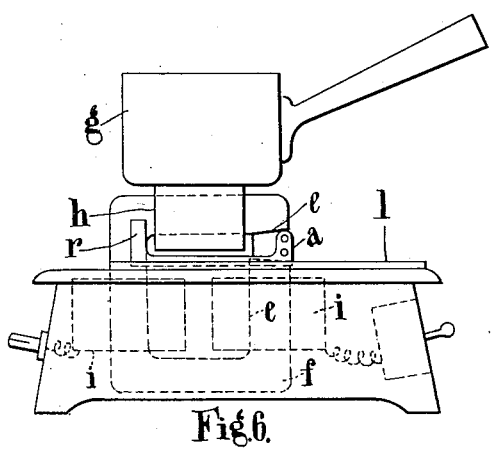
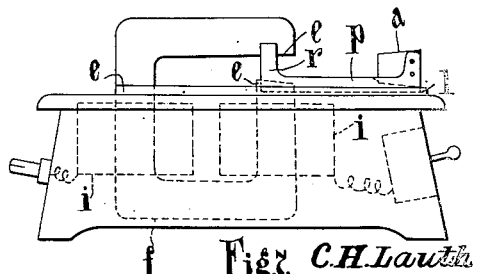
C. H. Lauth
INVENTOR
BY H. R. Kerslake
ATTORNEY

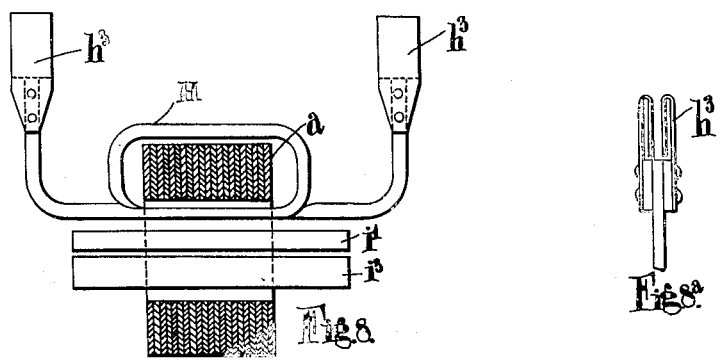
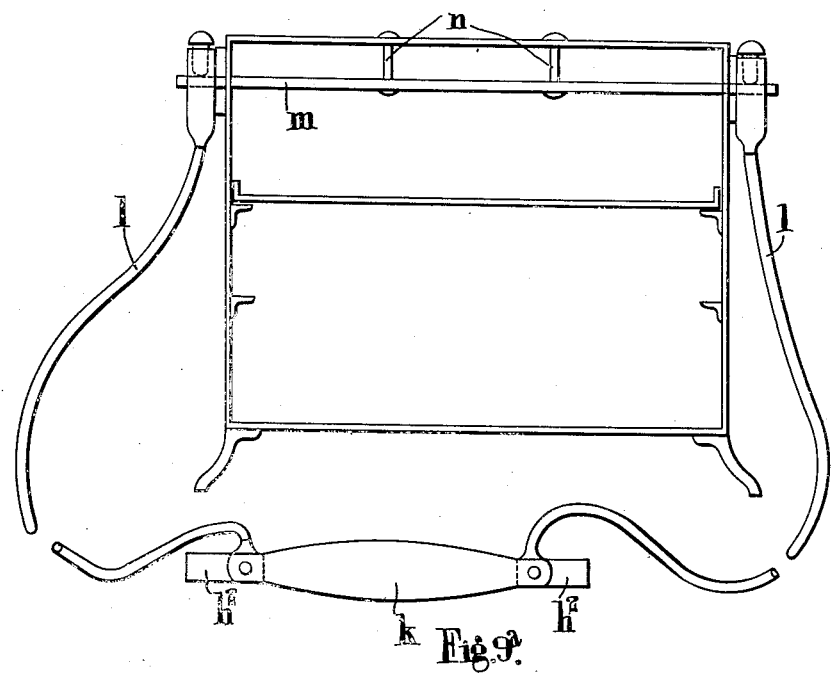
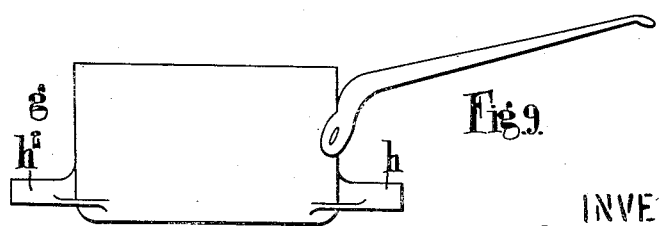

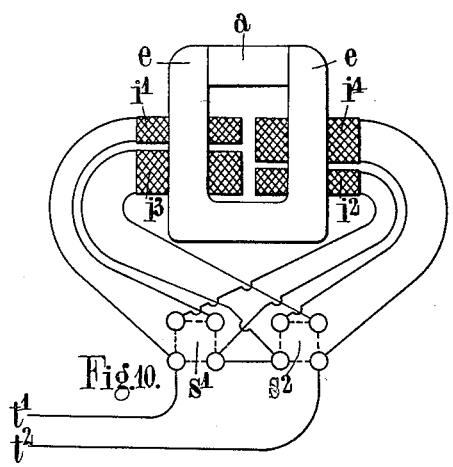
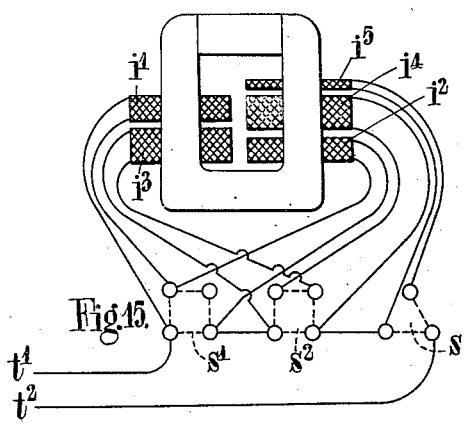
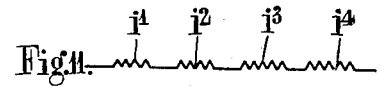
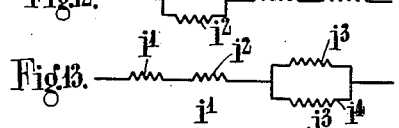
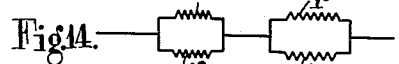
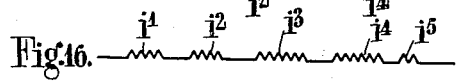
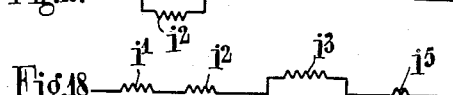
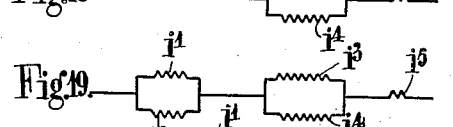
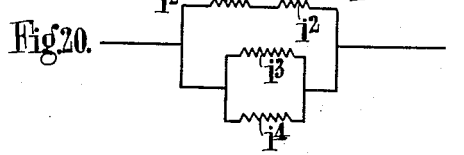

UNITED STATES PATENT OFFICE.

CLARENCE HAROLD LAUTH, OF LONDON, ENGLAND.

ELECTRIC COOKING OR HEATING VESSEL AND APPARATUS.

1,398,867. Specification of Letters Patent. Patented Nov. 29, 1921.

Application filed December 16, 1919. Serial No. 345,353.

*To all whom it may concern:*

Be it known that I, CLARENCE HAROLD LAUTH, a subject of the King of Great Britain and Ireland, and residing at 11 Highbury Mansions, London, N. 1, England, have invented certain new and useful Improvements in and Relating to Electric Cooking or Heating Vessels and Apparatus, of which the following is a specification.

This invention relates to improved electric cooking or like heating apparatus of the kind in which the cooking or heating vessels forms part of the secondary circuit of a static transformer embodied in the apparatus.

One of the main objects of the invention is to provide means which will allow the cooking or like heating vessel in an apparatus of the kind referred to, to be readily put on and taken off the transformer of which it forms part, merely by handling the vessel, other objects being to lock the vessel securely in position when cooking on the transformer, and by the use of automatically acting means, to render waste of current or damage through carelessness on the part of the cook almost impossible.

It has hitherto been proposed in connection with electric cooking or heating apparatus, in which the cooking vessel forms part of the secondary circuit of a static transformer embodied in the apparatus, to link the vessel and the remainder of the secondary circuit completing such circuit on to the magnetic circuit of the transformer by means of a removable yoke forming part of and completing the magnetic circuit of the transformer, and passing through a transverse passage or tube piercing the body of the vessel or a downward extension of the vessel itself.

According to one feature of the present invention use is made in a cooking or like heating apparatus of the kind referred to of a movable yoke forming part of the magnetic circuit of the transformer and hereinafter referred to as the "keeper," which keeper is attached to the stationary part of the apparatus in such a manner as to be guided toward and complete the magnetic circuit, when the secondary circuit of the transformer is placed in position, without the keeper being in any way directly handled, the secondary circuit being adapted to be closed through the walls of the vessel for the purpose of generating heat therein.

It will thus be seen that by this special attachment of the keeper to the stationary part of the apparatus, only the vessel requires to be handled, which is of special advantage, as compared with the forms of construction of combined cooking vessel and transformer as heretofore proposed.

A further important advantage attained according to this feature of the invention is that in the event of any of the switches being inadvertently closed the keeper will automatically close the magnetic circuit, thereby preventing damage being done to the supply circuit or transformer.

Referring to the accompanying drawings which illustrate this feature of the invention by way of example:

Figures 1 and 2 are respectively an end view and an elevation of the cooking apparatus with the vessel removed therefrom.

Fig. 3 is a section of the complete apparatus with the cooking vessel in position.

Fig. 4 is a side elevation, and Fig. 5 is a bottom view of a cooking vessel suitable for use with the apparatus.

Figs. 6 and 7 show a modified form of construction of the transformer.

Fig. 8 shows an open secondary coil adapted to slide on and off the "keeper" of the transformer and to engage with a vessel provided with contacts such as shown in Figs. 3 and 9, or with the terminals of a grill such as shown in Fig. 9ª.

Fig. 8ª is a detail of the vessel engaging spring terminals.

Fig. 9 is a side elevation of the cooking vessel removed.

Fig. 9ª is an elevation of a grill adapted for use in connection with the cooking apparatus.

Fig. 10 shows diagrammatically an arrangement of the primary coils and switches which gives four different combinations of coils as shown in Figs. 11 to 14.

Fig. 15 is a diagram of connections of the coils mounted in the transformer illustrated in Figs. 1 to 3 whereby four additional combinations of coils can be obtained as suggested in Figs. 16 to 19.

Fig. 20 shows a further combination of the coils.

Referring to Figs. 1 to 9ª, *a* is the keeper pivotally mounted on a support $b$ carried by a spring $c$ which is suitably secured to the stationary casing $d$ of the apparatus. In order to dispense with the use of clamps and avoid vibrations or hammering while at the same time providing a good mechanical joint, the keeper is preferably made wedge shaped and the jaws $e$ of the core $f$ of the transformer shaped accordingly, so that when the current is switched on, the former is tightly wedged into the latter.

The keeper and core of the transformer are preferably built of laminated iron sheets. Moreover with the object of preventing heat being transmitted from the vessel and connections thereof to the keeper, and thereby to the transformer, the keeper is preferably covered in any suitable manner with a heat insulating material having a bright, non-radiating, non-absorbent surface.

Further, with the object of reducing magnetic leakage, the width of the keeper between the jaws $e$ $e$ is kept short.

When the current is off, the keeper automatically rises into the position shown in Figs. 1 and 2, thereby allowing the open coil H (see Figs. 3 and 8) or vessel $g$ with its saddle $h$ (Fig. 4) to be readily slipped over it, whereupon the weight of the said coil or of the cooking vessel automatically depresses the keeper and closes the magnetic circuit, as shown in Fig. 3.

Referring to the modification illustrated in Figs. 6 and 7, the wedge shaped keeper $a$ is carried by a frame $p$ which is mounted on the casing $d$ in such a manner as to slide horizontally over the top thereof.

When the vessel is placed on the cooker, the saddle $h$ abuts against the projections $r$ of the frame $p$ and upon its being moved laterally, it forces the keeper between the jaws $e$ of the magnetic core "$f$". On removing the vessel the saddle pressing against the keeper automatically forces it out, the cooker then being ready to receive another vessel.

Figs. 6 and 7 show the keeper in its closed and open position respectively. The frame $p$ may be kept in position by means of guides $l$ attached to the top of the casing.

In either type of transformer, on switching the current on to the primary coils, the magnetic attraction holds the keeper firmly in position and in the case of a vessel of the construction shown in Figs. 4 and 5 prevents such vessel from being removed until the current has been switched off, thereby preventing waste of current through the cook forgetting to switch the current off when removing the cooking vessel, and accidentally upsetting of the vessel while cooking. Should the current be switched on inadvertently when the coil H or the vessel is not on, the keeper will immediately be drawn in by magnetic attraction and close the magnetic circuit, thereby greatly reducing the current flowing in the primaries, and thus avoiding waste of current and preventing damage to the primaries or to the supply circuit.

Referring to Figs. 8–9, an open coil H which may consist of one half or one or more turns is mechanically protected or armored so as to be suitable for sliding on to the keeper $a$, and is provided with springs or other terminals $h^3$ adapted to engage with or be bolted or clamped to contacts fixed to the cooking utensils, for example such as the contacts $h^2$ fixed to the saucepan $g$ shown in Fig. 9, or to the contacts $h^2$ of the grill shown in Fig. 9ª. In the latter utensil the contacts $h^2$ are connected together mechanically by means of an insulating handle $k$ and connected electrically by flexible connections $l$ to a heating element $m$ consisting of a plate or wire of stout section or the like supported by hangers $n$.

The continuity of the part of the metal lid of the transformer which lies between the jaws $e$, $e$ of the magnetic core in Figs. 2 and 6, is preferably broken as shown at $d^1$ and covered by a metal plate $d^2$ or trough insulated therefrom for the purpose of preventing the lid from itself becoming a secondary circuit of the transformer.

It is broadly known in connection with electric cooking and heating apparatus of the kind referred to, to control the heat by selectively interconnecting several main primary coils of one and the same transformer in different ways so as to obtain different degrees of heat, and another main object of this invention is to provide improved means for controlling the heat for such operations, as stewing, frying, brazing or boiling food and the like, in a manner which will insure a higher degree of precision and certainty, and a more immediate effect than has hitherto been attained, and this simply by following the switching directions which are marked on the outside of the apparatus. Other objects of this part of the invention are, to prevent the setting up of excessive voltages, avoid the use of choking coils and the consequent reduction of the power factor, reduce the amount of copper of the primary coils to a minimum, and to increase the efficiency of the primaries at intermediate and lower heats.

With these further objects in view another feature of the invention consists in controlling the heat in an electric heating or cooking apparatus of the type referred to by selectively interconecting at least four main primary coils provided on the transformer by series, parallel, or series-parallel connections, and in choosing the dimensions of such coils in such a manner as to provide at least four different main heats, $e.$ $g.$, the heats necessary for "slow simmer,"

"quick simmer," "slow boil" and "quick boil" without any of such main coils being idle, whereby the setting up of excessive voltages is avoided.

This feature of the invention is shown in Figs. 2 and 3, and in the diagrams Figs. 10-20.

Fig. 10 shows diagrammatically an arrangement of the primary coils and switches which gives four different combinations of coils shown in Figs. 11-14 respectively while Fig. 15 shows the diagram of connections of the coils mounted in the transformer illustrated in Figs. 1-3, whereby four additional combinations of coils can be obtained as shown in Figs. 16—19, Fig. 20 illustrating a further combination of coils.

Referring to Figs. 10-14, the group of coils $i_1$ and $i_2$ is permanently joined in series with the group $i_3$ and $i_4$. The switch $s_1$ may be of the rotary, combined or any other type, being preferably of the type shown in Fig. 1, so that when it is up, coils $i_1$ and $i_2$ are in parallel, when it is in its middle position no current can pass in the primaries, and when it is down, coils $i_1$ and $i_2$ are in series. Swith $s_2$ serves the same purpose in connection with coils $i_3$ and $i_4$. $t_1$ $t_2$ are the leads of connection with the supply circuit.

It is to be pointed out in connection with this system of apparatus and heat control that if, with the vessels designed for use therewith, W watts are required to produce the effect of "slow simmer" on liquid contents of the vessels, then approximately 1.5 W watts are required to produce "quick simmer," 2 W watts to produce "slow boil," and 4 W watts to produce "quick boil."

In order to secure this, the number of turns on the coils $i_1$ and $i_2$ are made equal, while the number of turns of $i_3$ and $i_4$ are also made equal to each other. In order to produce the best results the following proportions are employed.

Assuming that the total number of turns in all four coils is 1000 $x$, then the number of turns of each one of the coils $i_1$ and $i_2$ must not be less than 100 $x$ and not be more than 220 $x$.

If, for example, 200 $x$ turns be used on coil $i_1$, then 200 $x$ are used on coil $i_2$. This leaves 600 $x$ turns to go on $i_3$ and $i_4$, and since they have equal turns these would be 300 $x$ turns on $i_3$ and 300 $x$ turns on $i_4$.

These figures give the above mentioned heats exactly.

In the case of "slow simmer," both switches $s_1$ and $s_2$ are turned down and in this case all the coils are connected in series as shown in Fig. 11.

For "quick simmer" $s_1$ is up and $s_2$ down, and $i_1$ and $i_2$ are in parallel while $i_3$ and $i_4$ are in series, as shown in Fig. 12.

For "slow boil" $s_1$ is down, $s_2$ is up and $i_1$ and $i_2$ are in series, while $i_3$ and $i_4$ are in parallel as shown in Fig. 13.

For "quick boil" $s_1$ and $s_2$ are both up, and coils $i_1$ and $i_2$ are in parallel, while coils $i_3$ and $i_4$ are also in parallel, as shown in Fig. 14.

While providing for the relative heating effects above mentioned, the method of heat control according to the invention has the advantage of avoiding idle coils on any one of the heats, and of permitting the weight of copper in the primaries to be reduced to a mimimum.

In the arrangement of heat control illustrated in Figs. 1-3 and 15-19, the heat of each of the main heats above described may be slightly reduced by means of an additional small coil $i_5$, thereby providing eight different heat adjustments.

The cail $i_5$ is provided with a small number of turns, and is arranged to be connected at will in series with any one of the main groups by means of an additional switch $s_3$, as shown in Figs. 16-19.

By the addition of the fifth coil $i_5$, the total power variation is extended from a range of 1 to 4 to a range of about 1 to 5.

In the arrangement shown in Fig. 15, good results are obtained by the following proportions of turns:

Assuming that the total number of turns on all the coils is 1000 $x$, then if each of the coils $i_1$, $i_2$, has 160 $x$ turns and each of the coils $i_3$ and $i_4$ has 300 $x$ turns, $i_5$ must have 80 $x$ turns, and the power available on each heat is according to the following proportions:—

Slow simmer with reducer__ W watts
Slow simmer without reducer 1.16 W watts
Quick simmer with reducer__ 1.32 W watts
Quick simmer without reducer 1.73 W watts
Slow boil with reducer_____ 2 W watts
Slow boil without reducer___ 2.6 W watts
Quick boil with reducer_____ 3.4 W watts
Quick boil without reducer__ 4.7 W watts In order to get the best results with the arrangement shown in Fig. 15, the following limiting proportions should be observed.

Coils $i_3$ and $i_4$ should have about 300 $x$ turns each. Coils $i_1$ and $i_2$ should have not more than 170 $x$ turns each and not less than 150 $x$ turns each. The total number of turns on all the coils being assumed to be 1000 $x$ turns, the limits of variation for coil $i_5$ should lie between 60 $x$ turns and 100 $x$ turns according as $i_1$ and $i_2$ have more or less turns.

Where it is desired to have a heat which is more than double that which is necessary to maintain "quick boil," as for example in bringing cold liquids rapidly up to boiling point, the group of coils $i_1$, $i_2$ connected in series is joined in parallel with group $i_3$ and $i_4$, the latter coils being themselves in parallel, as shown in Fig. 20. This arrangement is intended to form an alternative to be used in combination with that described with reference to Fig. 10, a suitable additional switching arrangement being used for the purpose. The relative heating capacity of this arrangement is 9 W watts.

Where this alternate heat is required the number of turns should be proportioned as follows:

Assuming that the total number of turns in the four coils is 1000 $x$, then each of the coils $i_1$ and $i_2$ should have $166\frac{2}{3}$ $x$ turns and each of the coils $i_3$ and $i_4$ $333\frac{1}{3}$ $x$ turns.

The fifth coil $i_5$ described with reference to Fig. 15 may be added to the latter combination giving a total number of ten different heats and a range of approximately 1 to 11.

The cooking equipment may comprise one large and several small transformers, and the contents of the vessel be brought to the boil rapidly on the large transformer, and then the vessel be readily transferred on to a smaller transformer to boil or simmer quickly or slowly.

By combining one very fast heating transformer with a number of smaller transformers, which latter transformers keep the vessels boiling or simmering after they have been heated up on the former, the combined set is made faster, cheaper and lighter.

Such a combination also reduces the consumption of current in that the maximum speed of the smaller transformers may be limited to that required to maintain a "quick boil," so that more current than is sufficient for this purpose cannot be taken.

The combination of transformers of different size, each of which has, for the set of cooking vessels provided therewith, definite heats marked upon it, as shown in Fig. 1, has the advantage of giving a very wide range of heats, each of which is exact and invariable in its effects, and each of which is almost instantaneously produced by operating the switches.

The ease and precision of control afforded by the means just described are intended to make cooking easy to learn, to produce economy of time, and to reduce the consumption of electricity to the necessary minimum.

What I claim is:—

1. In electric cooking and like heating apparatus comprising in combination a static transformer, having an open magnetic circuit, and a primary and a secondary electric circuit, and a heating device forming part of the secondary electric circuit of the transformer, a movable magnetic keeper and means by which the said keeper is attached to the stationary part of the apparatus, said means being such as to allow the keeper to be guided toward and complete the magnetic circuit when the secondary electric circuit is placed in position, without the keeper being in any way directly handled, as set forth.

2. In electric cooking and like heating apparatus comprising in combination a static transformer, having an open magnetic circuit, and a primary and a secondary electric circuit, and a heating device forming part of the secondary electric circuit of the transformer, a movable magnetic keeper and means by which the said keeper is attached to the stationary part of the apparatus, said means being such as to allow the keeper automatically to be guided toward and to close the magnetic circuit when the secondary electric circuit is placed in position without the keeper being in any way directly handled, as set forth.

3. In electric cooking and like heating apparatus comprising in combination a static transformer, having an open magnetic circuit, and a primary and a secondary electric circuit, and a heating device forming part of a secondary electric circuit of the transformer, a magnetic keeper, a support on which the magnetic keeper is pivoted and a spring attached to the stationary part of the apparatus and to which the said support is secured, as and for the purpose set forth.

4. An electric cooking and like heating apparatus as claimed in claim 1, in which the movable magnetic keeper is made wedge-shaped and fits into wedge-shaped jaws of the open magnetic circuit of the transformer, as set forth.

5. An electric cooking and like heating apparatus as claimed in claim 1, in which the movable magnetic keeper is covered with a heat insulating, non-magnetic material with a non-radiating non-absorbent surface, as set forth.

6. An electric cooking and like heating apparatus as claimed in claim 1, having a metal casing for the transformer, a metal lid for the said casing, a discontinuity in the said lid facing the open part of the magnetic circuit, a metal plate on the discontinuous part of the lid and an insulation between the said plate and lid, as and for the purpose set forth.

7. An electric cooking and like heating apparatus as claimed in claim 1, the secondary electric circuit of which is divided into two parts, one part thereof consisting of an open coil and of terminals fitted thereon and being constructed so as to engage with the keeper, and the other part thereof consisting of a heating device having contacts constructed so as to engage with the terminals on the open coil, as set forth.

8. In electric cooking and like heating apparatus of high amperage and low voltage comprising a static transformer having a magnetic circuit and a secondary electric circuit coupled with the said magnetic circuit, and a heating vessel forming part of the secondary electric circuit, a primary electric circuit comprising at least four main coils coupled with the magnetic circuit and means for selectively interconnecting all the said main coils, in series, parallel, or series parallel without any of them being idle, the dimensions of the main coils being such as to give at least four different heats, as set forth.

9. An electric cooking and like heating apparatus as claimed in claim 8, having a small auxiliary coil and means for interconnecting the same with the main coils for the purpose of slightly varying any one of the four different heats, as set forth.

10. An electric cooking and like heating apparatus as claimed in claim 9, in which if $1000\,x$ is the total number of turns on the four main coils and small auxiliary coil, two of the main coils have equal numbers of turns which are not less than $150\,x$ turns or more than $170\,x$ turns each, the small coil has not more than $100\,x$ turns and not less than $60\,x$ turns, and the other two main coils have equal numbers of turns of about $300\,x$ turns each, as set forth.

In testimony whereof I have signed my name to this specification.

CLARENCE HAROLD LAUTH